United States Patent
Mai et al.

(10) Patent No.: US 7,052,169 B2
(45) Date of Patent: May 30, 2006

(54) BACKLIGHT MODULE

(75) Inventors: Che-Kuei Mai, Hsinchu (TW); Yi-Hung Tsai, Jubei (TW)

(73) Assignee: Toppoly Optoelectronics Corp., Chu-Nan (TW)

( * ) Notice: Subject to any disclaimer, the term of this patent is extended or adjusted under 35 U.S.C. 154(b) by 135 days.

(21) Appl. No.: 10/836,122

(22) Filed: Apr. 29, 2004

(65) Prior Publication Data
US 2004/0257492 A1 Dec. 23, 2004

(30) Foreign Application Priority Data
Apr. 30, 2003 (TW) .............................. 92206927 U

(51) Int. Cl.
*F21V 7/04* (2006.01)
(52) U.S. Cl. ..................... 362/632; 362/362; 362/375
(58) Field of Classification Search ................ 362/362, 362/632, 375, 561; 349/58, 60, 70; 345/102, 345/87
See application file for complete search history.

(56) References Cited

U.S. PATENT DOCUMENTS

| 2,951,611 | A | * | 9/1960 | Janness et al. ............... 362/221 |
| 5,537,296 | A | * | 7/1996 | Kimura et al. .............. 362/634 |
| 5,666,172 | A | * | 9/1997 | Ida et al. ...................... 349/58 |
| 5,815,227 | A | * | 9/1998 | Lee .............................. 349/67 |
| 6,513,944 | B1 | | 2/2003 | Chou |

FOREIGN PATENT DOCUMENTS

TW 454854 9/2001

* cited by examiner

Primary Examiner—Ali Alavi
(74) Attorney, Agent, or Firm—Liu & Liu

(57) ABSTRACT

A backlight module. The backlight module comprises a first frame, a cover, a lamp, a light guide plate, and a second frame. The cover comprises a hinge and a fastener. The cover is connected to the first frame by the hinge. The lamp is disposed in an opening formed by the first frame and the cover. The light guide plate is disposed near the lamp to guide light therefrom. The second frame is disposed on the back of the light guide plate. The second frame comprises a connection port receiving the fastener.

20 Claims, 6 Drawing Sheets

BACKLIGHT MODULE

BACKGROUND OF THE INVENTION

1. Field of the Invention

The present invention relates to a backlight module and in particular to an easily removed backlight lamp module.

2. Description of the Related Art

After thin film transistor liquid crystal displays (TFT LCDs) are used for a period, the lamp of the backlight module may burn out. In order to replace the lamp, the TFT LCD must be disassembled, and generally, be returned to the manufacturer. However, in order to provide sufficient service for users, the operating costs of the manufacturer increase, impacting profit.

Taiwan Patent no. 454854 discloses a backlight module which allows replacement of lamps. However, to replace lamps in the invention disclosed in No. 454854, the housing of the backlight module must be disassembled. It is a difficult step for an user to disassemble the housing, no matter in psychological or technological consideration.

Hence, there is a need for a backlight module with easily replaceable lamp.

SUMMARY OF THE INVENTION

Accordingly, the present invention is directed to display devices incorporating a backlight lamp module enabling easy replacement of burnt-out lamps. The display device includes an LCD panel disposed on a backlight module. The backlight module includes a lamp, and first and second frames connected together to form a housing for supporting the lamp therein.

In one aspect of the present invention, the backlight module includes a cover connected to the housing at one end and releaseably fastened to the housing at another end. When the cover is fastened to the housing, the cover supports the lamp within the housing, and when the cover is released from the housing, the lamp can be removed from the housing.

In one embodiment, the cover is hingedly attached to the first frame and releaseably fastened to the second frame. In certain embodiments, the cover includes a fastener and the second frame includes a complementary connection port. The connection port is adapted to releaseably engage with the fastener.

In another embodiment, the second frame includes first and second sections. The cover is hingedly connected to the first section and releaseably fastened to the second section. In certain embodiments, the cover includes a fastener and the second section includes a complementary connection port. The connection port is adapted to releaseably engage with the fastener.

In another aspect of the present invention, the second frame is releaseably fastened to the first frame. The second frame includes a fastener and the first frame includes a complementary connection port. The fastener and the connection port allow the second frame to releaseably connect to the first frame.

In yet another aspect of the present invention, the cover includes a pin for supporting the lamp within the housing. When the cover is connected to the housing, the pin contacts the lamp to hold with lamp within the housing.

With the present invention, users can easily replace burnt-out backlight lamps. Because the lamp needs to be replaced regularly, the present invention provides advantages of convenience over existing technologies.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
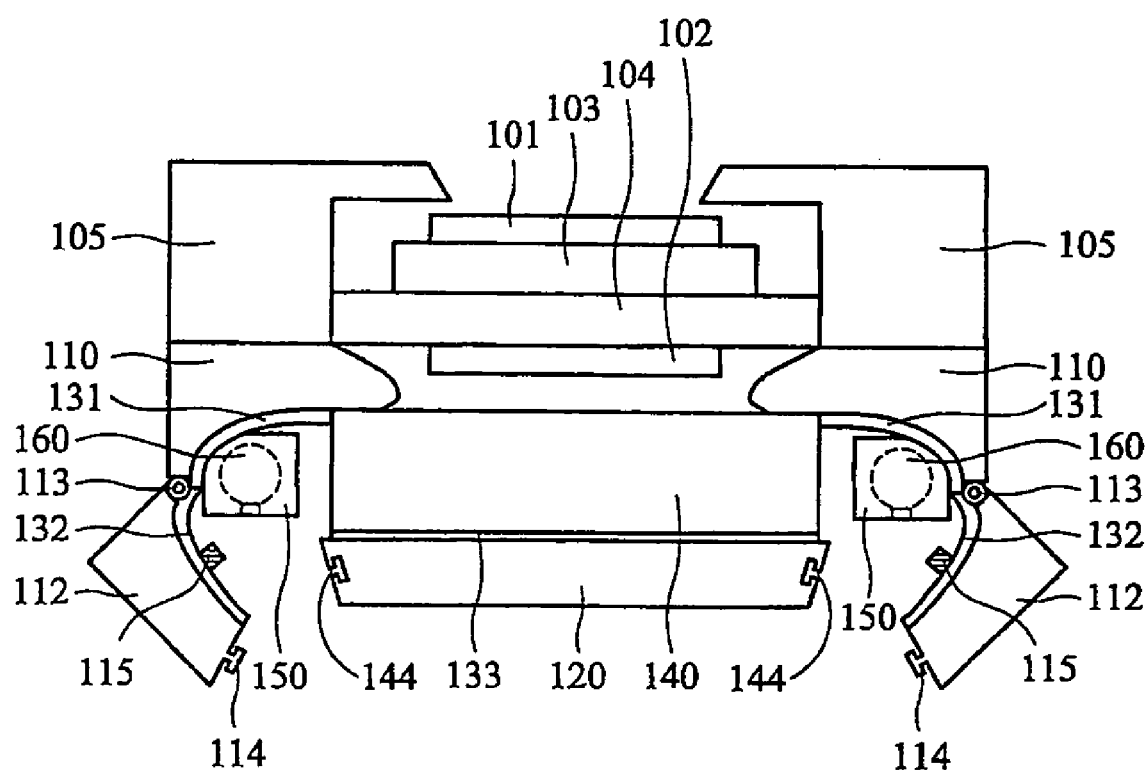
FIG. 1 is an isometric drawing of an LCD device incorporating a backlight module in accordance with one embodiment of the present invention.

FIG. 1 is an isometric drawing of an LCD device incorporating a backlight module in accordance with one embodiment of the present invention. The backlight module is disposed on the back of a TFT LCD to provide backlight. In FIG. 1, the backlight module is disposed behind the polarizer 102. A TFT substrate 104 and a color filter substrate 103 are disposed between the polarizer 102 and a polarizer 101. A housing 105 fixes the polarizers 102, 101, the TFT substrate 104, and the color filter substrate 103.

Figure 2:
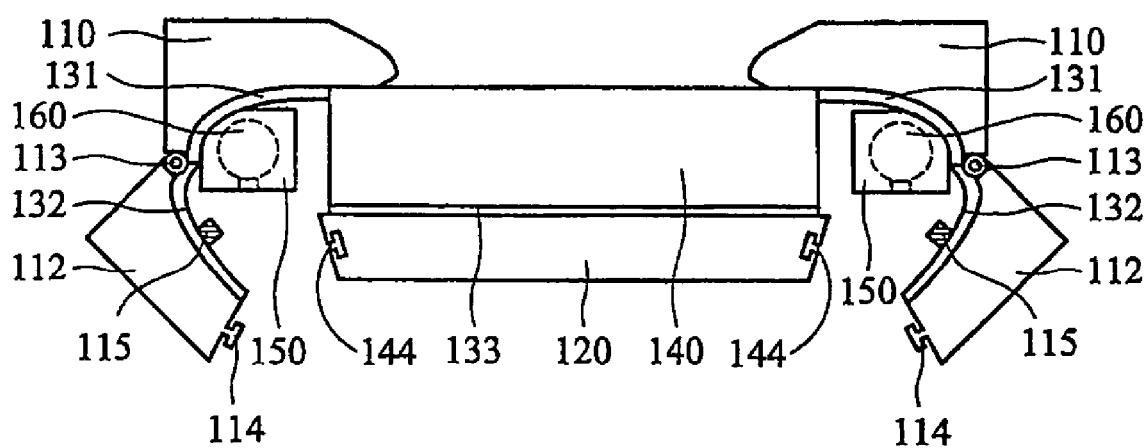
FIG. 2 is a schematic diagram of the backlight module shown in FIG. 1.

FIG. 2 is a schematic diagram of the backlight module shown in FIG 1. The backlight module comprises a first frame 110, a cover 112, a lamp 160, a light guide plate 140, and a second frame 120. The first and second frames are connected together to form a housing for supporting the lamp therein. The cover 112 comprises a hinge 113 and a fastener 114. The cover 112 is connected to the first frame 110 by the hinge 113. The lamp 160 is disposed in an opening formed by the first frame 110 and the cover 112. The light guide plate 140 is disposed near the lamp 160 to guide light from the lamp 160 to emit from the front surface of the light guide plate. The second frame 120 is disposed on the back of the light guide plate 140. The second frame 120 comprises a connection port 144. The connection port 144 is adapted to releaseably engage with the fastener 114.

A reflector 133 can be disposed between the light guide plate 140 and the second frame 120 to reflect the light from the lamp 160 to the front surface of the light guide plate. A reflector 132 can be disposed on the cover 112 facing the lamp 160. As well, a reflector 131 can be disposed on the first frame 110 facing the lamp 160. The reflectors 131, 132 reflect the light into the light guide plate 140.

Figure 4A:
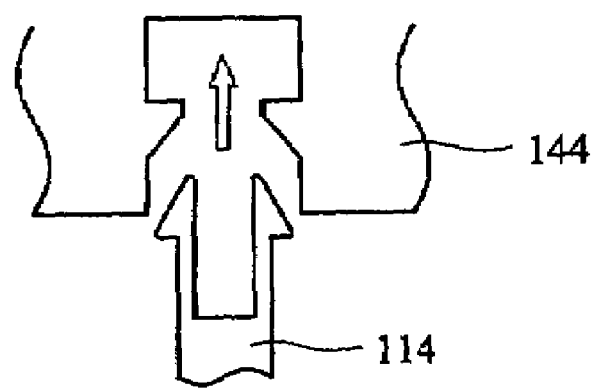
FIG. 4a is a perspective drawing showing a fastener and a connection port.

FIG. 4a is a perspective drawing showing a fastener and a connection port. FIG. 4a shows a detailed structure of the fastener 114 and connection port 144. The fastener 114 is hook shaped. The connection port 144 is a recess. Fastener 114 is connected with the connection port 144 by elastic force. The fastener 114 and connection port 144 can be of plastic or other elastic materials.

Figure 4B:
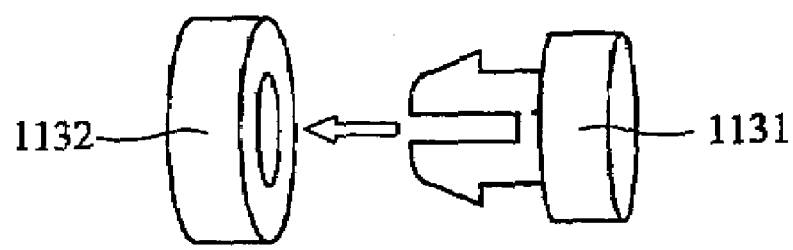
FIG. 4b is a perspective drawing showing a hinge.

FIG. 4b is a perspective drawing showing a hinge. As shown in FIG. 4b, the hinge 113 engages with an engaging port 1132 on the first frame 110 by engaging member 1131 disposed on the cover 112. The engaging member 1131 is hook shaped. The engaging port 1132 is a through hole. Engaging member 1131 is connected with the engaging port 1132 by elastic force. The engaging member 1131 can be of plastic or other elastic materials.

Alternatively, the hinge 113 can also be connected to the first frame 110 by rivets, and can be of metal.

The hinge allows the cover to move relative to the first and second frames. Alternatively, the cover can be connected to the first frame by means well known in the art which allows the cover to move. The cover can be made from a substantially flexible material, such as a metal or plastic, and can be fixed to the first frame such that the cover can flex about a pivot point to move.

In FIG. 2, the lamp 160 and the lamp holder 150 are disposed in an opening formed by the first frame 110 and the cover 112. As shown in FIG. 3, lamp 160 is fixed by the first lamp holder 150 and a second lamp holder 159. At least one lamp clamping apparatus 155 can be disposed between the first lamp holder 150 and the second lamp holder 159. The lamp clamping apparatus 155 clamps the lamp 160 to prevent slipping.

Figure 3A:
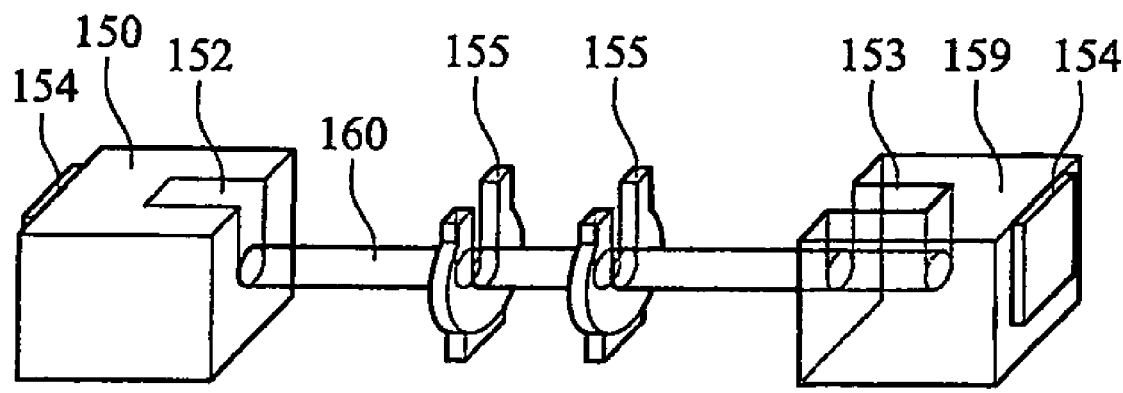
FIG. 3a is a perspective drawing showing a lamp holder and a lamp clamping apparatus in accordance with one embodiment of the present invention.
Figure 3B:
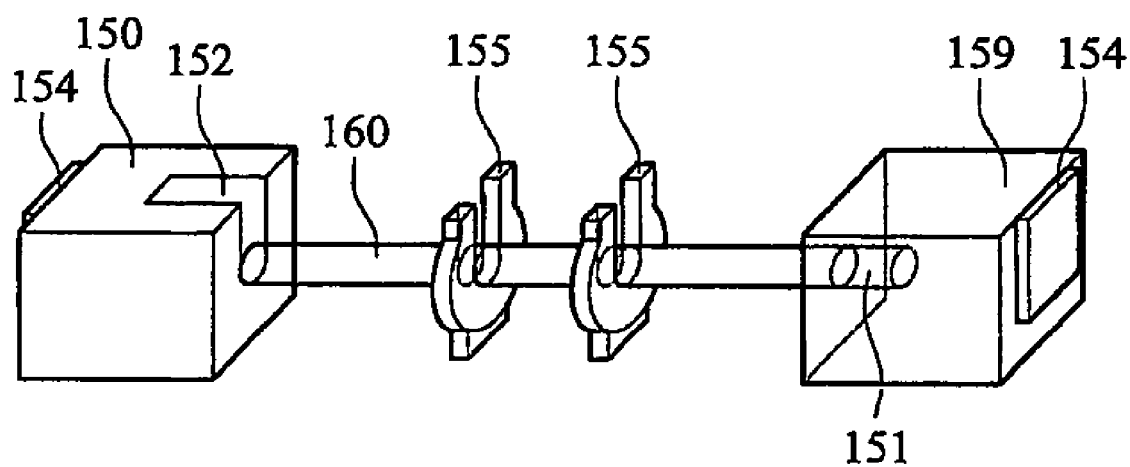
FIG. 3b is a perspective drawing showing a lamp holder and a lamp clamping apparatus in accordance with another embodiment of the present invention.

As shown in FIG. 3a, the first lamp holder 150 has a first lamp receiving port 152, and the second lamp holder 159 has a second lamp receiving port 153. The lamp 160 can be installed in the first lamp holder 150 and the second lamp holder 159 through the first lamp receiving port 152 and the second lamp receiving port 153. As shown in FIG. 3b, the second lamp holder 159 can also have no lamp receiving port but with a lamp insertion hole 151.

The first lamp holder 150 and the second lamp holder 159 have contact 154 to connect with a power source.

Figure 4C:
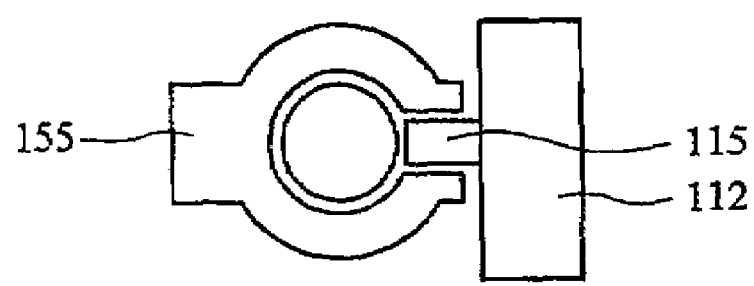
FIG. 4c is an isometric drawing showing a pin in accordance with one embodiment of the present invention.

As shown in FIG. 2, a pin 115 is disposed on the cover 112. The pin 115 can be plugged into the first lamp receiving port 152 (FIG. 3a) or the second lamp receiving port 153 (FIG. 3a) to prevent slipping. As well, as shown in FIG. 4c, the pin 115 can also be plugged into an opening of the lamp clamping apparatus 155 to prevent slipping.

Figure 5:
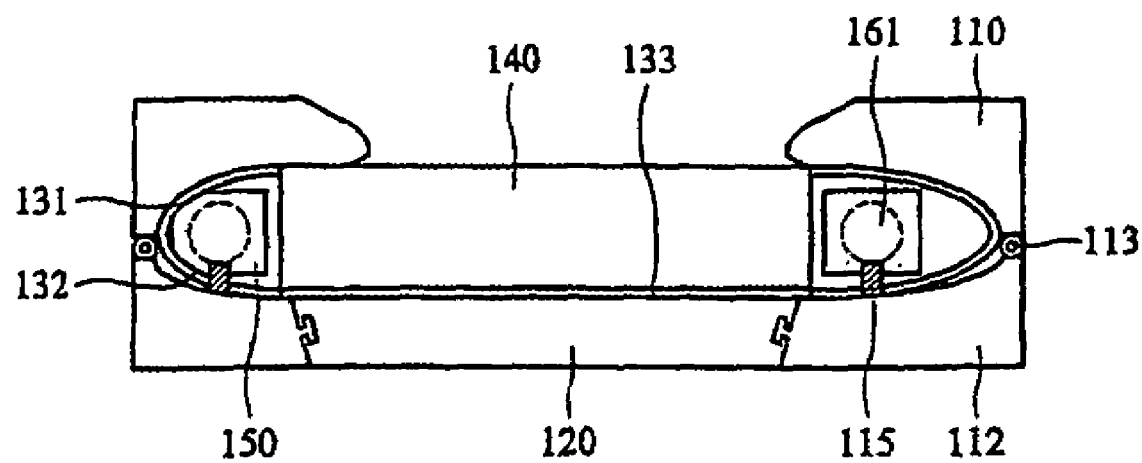
FIG. 5 is an isometric drawing of the backlight module shown in FIG. 2 with the cover connected to the housing.

FIG. 5 shows the closed condition of the cover 112 of the first embodiment.

Figure 6:
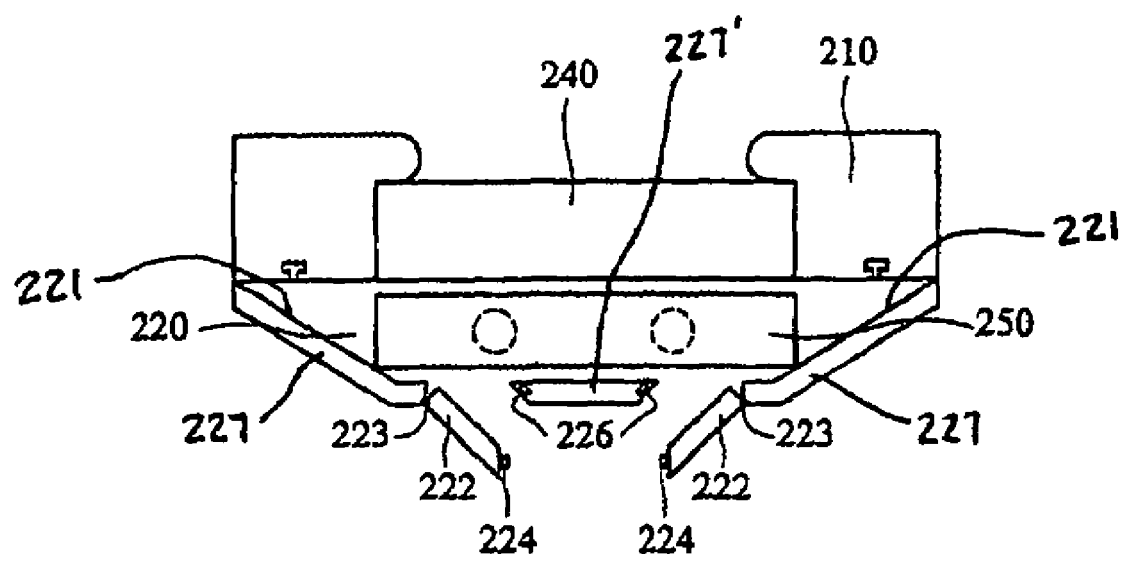
FIG. 6 is a schematic diagram of a backlight module in accordance with another embodiment of the present invention.

FIG. 6 shows the second embodiment of the present invention. The second embodiment comprises a first frame 210, a light guide plate 240, a second frame 220, covers 222, and a lamp assembly 250. The light guide plate 240 is disposed in the first frame 210. The second frame 220 is disposed on the back of the first frame 210. The second frame 220 includes a first section 227 and a second section 227'. The cover 222 comprises a hinge 223, and the second section 227' of the second frame 220 includes connection ports 226. The cover 222 is connected to the second section 227' of the second frame 220 by the hinge 223. The cover 222 comprises a fastener 224 and is releaseably fastened to the second section of the second frame via the fastener. The fastener 224 can be fastened to the connection port 226. The lamp assembly 250 is disposed on the back of the light guide plate 240.

Figure 7A:
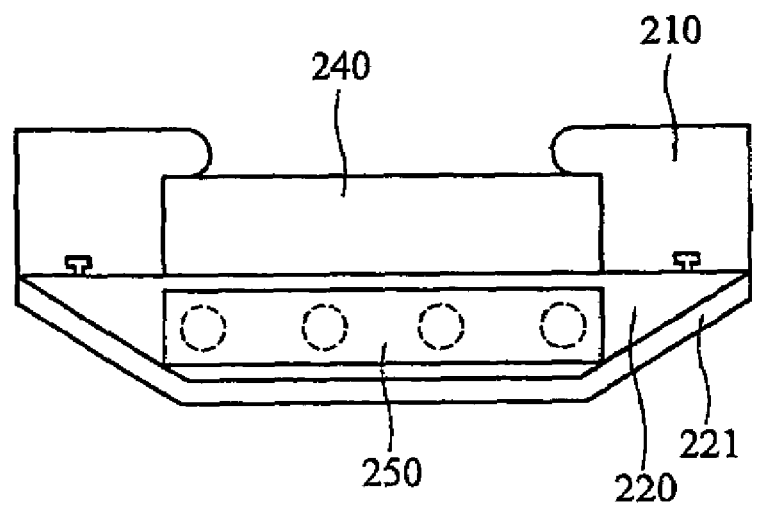
FIGS. 7a and 7b are schematic diagrams of a backlight module in accordance with another embodiment of the present invention.
Figure 7B:
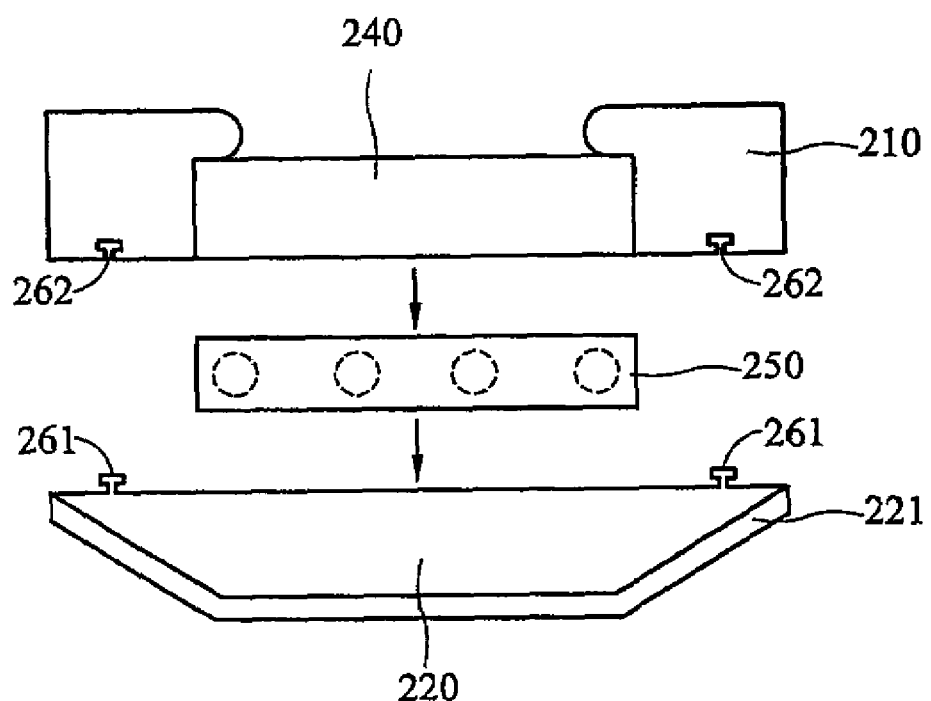

FIG. 7a and 7b show the third embodiment of the present invention. The third embodiment is similar to the second embodiment, except that the fastener 261 can be disposed on the second frame 220 and the connection port 262 can be disposed on the first frame 210.

In the second and third embodiments, a reflector 221 can be disposed on the second frame 220 to reflect the light from the lamp assembly 250 into the light guide plate 240.

With the present invention, users can easily replace burnt-out backlight lamps. Because lamps require replacement regularly, the present invention provides advantages of convenience over existing technologies.

Figure 8:
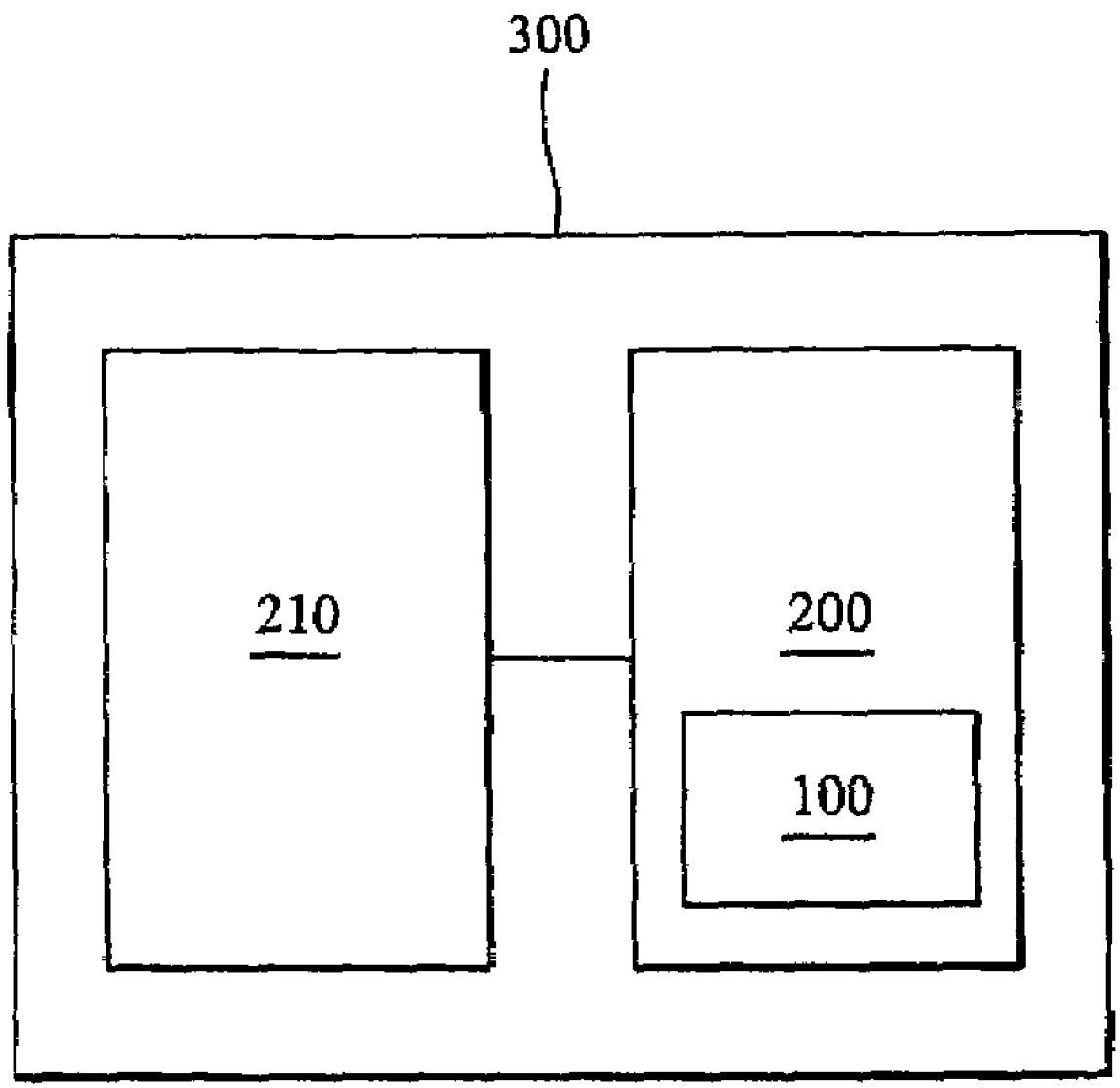
FIG. 8 is a schematic diagram of an electronic device that incorporates a display device having the inventive backlight module in accordance with one embodiment of the present invention.

FIG. 8 shows an electronic device 300 utilizing the present invention. The electronic device 300 comprises a display device 200 and a controller 210. The controller 210 is coupled with to the display device 200 to provide display data to the display device 200. The backlight module 100 of the present invention is disposed in the display device 200.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight module, comprising:
  a lamp;
  first and second frames connected together to form a housing for supporting the lamp therein; and
  a cover having a first end connected to the first frame and a second end releaseably fastened to the second frame;
  wherein when the cover is fastened to the second frame, the cover supports the lamp within the housing, and when the cover is released from the housing, the lamp is detachable from the housing.

2. The backlight module of claim 1, wherein the first end of the cover is hingedly connected to the first frame and the second end of the cover is releaseably fastened to the second frame.

3. The backlight module as claimed in claim 2, wherein the cover is hingedly connected to the first frame by a hinge that is elastic.

4. The backlight module as claimed in claim 2, wherein the cover is hingedly connected to the first frame by a hinge that comprises rivets.

5. The backlight module of claim 1, wherein one of the cover and the second frame includes a fastener and other one of the cover and the second frame includes a connection port adapted to releaseably engage the fastener.

6. The backlight module of claim 1, wherein the second frame includes first and second sections, and wherein the first end of the cover is hingedly connected to the first section, and the second end of the cover is releaseably fastened to the second section.

7. The backlight module of claim 1, wherein the cover includes a pin contacting the lamp when the cover is fastened to the second frame.

8. The backlight module of claim 1, further comprising another lamp that is detachable from the housing.

9. An LCD device comprising a backlight module as in claim 1 and a display panel disposed thereon.

10. The display device as claimed in claim 9, wherein the display panel comprises an LCD panel.

11. The LCD device as claimed in claim 9, wherein the backlight module further comprises a light guide plate, wherein the first frame is located between the display panel and the light guide plate on one side of the light guide plate, and the second frame is located on another side of the light guide plate.

12. The backlight module as claimed in claim 1, further comprising a reflector disposed on the cover, facing the lamp.

13. The backlight module as claimed in claim 1, further comprising a reflector disposed on the first frame, facing the lamp.

14. backlight module comprising:
   a lamp;
   a light guide plate having a front surface emitting light from the lamp and a back surface; and
   first and second frames releaseably fastened together to form a housing for supporting the lamp therein;
   wherein the second frame spans the back surface of the light guide plate, and when the second frame is fastened to the first frame, the second frame supports the lamp within the housing, and when the second frame is released from the first frame, the lamp is detachable from the housing.

15. The backlight module of claim 14, wherein one of the first frame and the second frame includes a fastener and other one of the first frame and the second frame includes a connection port adapted to releaseably engage the fastener.

16. A display device comprising a backlight module as in claim 14 and a display panel disposed thereon.

17. An electronic device, comprising:
   a display device as claimed in claim 16; and
   a controller operatively coupled to the display device, providing display data to the display device.

18. The electronic device as claimed in claim 17, wherein the display device comprises an LCD display.

19. The display device as claimed in claim 16, wherein the backlight module further comprises a light guide plate, wherein the first frame is located between the display panel and the light guide plate on one side of the light guide plate, and the second frame is located on another side of the light guide plate.

20. The backlight module as claimed in claim 6, further comprising a reflector disposed between the light guide plate and the housing, reflecting light to the front of the light guide plate.

* * * * *